(12) United States Patent
Coleridge et al.

(10) Patent No.: US 11,398,903 B1
(45) Date of Patent: *Jul. 26, 2022

(54) SYSTEM AND METHOD FOR GENERATING A CRYPTOGRAPHIC KEY

(71) Applicant: CHOL, Inc., Irvine, CA (US)

(72) Inventors: Robert Coleridge, Bellingham, WA (US); Malcolm Hutchinson, London (GB)

(73) Assignee: CHOL, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/102,601

(22) Filed: Aug. 13, 2018

Related U.S. Application Data

(63) Continuation of application No. 14/939,490, filed on Nov. 12, 2015, now Pat. No. 10,050,784.

(60) Provisional application No. 62/079,031, filed on Nov. 13, 2014.

(51) Int. Cl.
*H04L 9/00* (2022.01)
*H04L 9/08* (2006.01)
*H04L 17/02* (2006.01)

(52) U.S. Cl.
CPC .......... *H04L 9/0861* (2013.01); *H04L 9/0894* (2013.01)

(58) Field of Classification Search
CPC ........ G06F 21/36; G06F 21/602; G06F 21/64; H04L 9/0872; H04L 9/0861; H04L 9/0894
See application file for complete search history.

(56) References Cited

U.S. PATENT DOCUMENTS

| 7,240,208 | B1 * | 7/2007 | Oakley | H04L 9/0897 380/246 |
| 8,321,480 | B2 * | 11/2012 | Smith | G06F 16/214 707/812 |
| 8,532,343 | B1 * | 9/2013 | Freedman | G06V 40/172 382/115 |
| 8,601,598 | B2 * | 12/2013 | Ozzie | H04L 63/0428 713/153 |

(Continued)

OTHER PUBLICATIONS

Arif, et al.; ResearchGate, Gesture Based Sensor Encryption [online], Conference Paper Dec. 2012, [retrieved on Nov. 12, 2015], Retrieved from the Internet http://www.researchgate.net/publication/233427733_Gesture_based_sensor_en- cryption.

(Continued)

*Primary Examiner* — Gary S Gracia
(74) *Attorney, Agent, or Firm* — Knobbe, Martens, Olson & Bear, LLP

(57) ABSTRACT

A system and method for generating a cryptographic key using a sequence of data segments selected by a user from one or more data resources. Raw data from the one or more data resources corresponding to each of the selected data segments, and the sequence in which such data segments are selected, is extracted and processed to generate a key. The key can be used for any cryptographic and authentication purpose. By enabling a user to select the sequence of data segments from the one or more data resources in any manner the user desires, the user can create a strong key, but also easily remember the underlying data resource and chosen sequence. This technique provides enhanced security while maintaining ease of creation and use of such security.

21 Claims, 11 Drawing Sheets

(56) References Cited

U.S. PATENT DOCUMENTS

| | | | | |
|---|---|---|---|---|
| 8,621,036 | B1* | 12/2013 | L'Heureux | G06F 21/62 726/28 |
| 2008/0072037 | A1* | 3/2008 | Narayanan | H04L 63/0823 713/157 |
| 2008/0229109 | A1* | 9/2008 | Gantman | H04L 9/0869 713/176 |
| 2008/0263361 | A1* | 10/2008 | Dutta | H04L 9/0891 713/182 |
| 2009/0169003 | A1* | 7/2009 | Sung | H04N 21/4408 380/279 |
| 2010/0082970 | A1* | 4/2010 | Lindahl | G06F 21/10 713/150 |
| 2010/0246818 | A1* | 9/2010 | Yao | H04W 12/0433 380/270 |
| 2010/0287382 | A1* | 11/2010 | Gyorffy | G06F 21/36 713/185 |
| 2010/0322485 | A1* | 12/2010 | Riddiford | G06F 3/0481 726/2 |
| 2011/0019816 | A1* | 1/2011 | Inami | G06T 1/00 380/28 |
| 2011/0055585 | A1* | 3/2011 | Lee | H04L 9/0844 713/183 |
| 2012/0023574 | A1* | 1/2012 | Osborn | H04L 9/3226 726/19 |
| 2012/0079009 | A1* | 3/2012 | Carter | G06F 16/9577 709/203 |
| 2012/0159609 | A1* | 6/2012 | Griffin | G06F 21/36 726/17 |
| 2012/0170832 | A1* | 7/2012 | Liu | G06T 7/11 382/154 |
| 2012/0246463 | A1* | 9/2012 | Shea | H04L 63/064 713/153 |
| 2012/0291108 | A1* | 11/2012 | Talamo | H04L 9/3273 726/5 |
| 2013/0016835 | A1* | 1/2013 | Zbinden | H04L 9/0852 380/255 |
| 2013/0159732 | A1 | 6/2013 | Leoutsarakos | |
| 2013/0198198 | A1* | 8/2013 | Tsuchimoto | G06F 16/2228 707/741 |
| 2013/0254545 | A1* | 9/2013 | Wan | G06F 21/6218 713/176 |
| 2013/0268775 | A1* | 10/2013 | Hawkins | H04L 9/0872 713/189 |
| 2013/0305046 | A1* | 11/2013 | Mankovski | H04L 9/0894 713/168 |
| 2014/0115679 | A1* | 4/2014 | Barton | H04L 63/0853 726/5 |
| 2014/0189358 | A1* | 7/2014 | Grimen | H04N 21/4405 713/171 |
| 2016/0142204 | A1* | 5/2016 | Coleridge | H04L 9/0861 380/44 |
| 2016/0269178 | A1* | 9/2016 | Yang | H04L 63/0861 |

OTHER PUBLICATIONS

Admin, NevonProjects, Data Protection Using Hand Gesture Recognition [online], Jun. 27, 2013 [retrieved on Oct. 1, 2014], Retrieved from the Internet http://nevonprojects.com/data-protection-using-hand-gesture-reco- gnition/.

Tech Yard, How to Encrypt Data Using Images—PixelCryptor [online], [retrieved on Feb. 5, 2015], Retrieved from the Internet http://www.techyard.net/encrypt-data-securely-using-images/.

* cited by examiner

[0001] A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD

[0002] This disclosure relates to authentication techniques and to information security, and more specifically to the generation of a secure key using a sequence of segments taken from one or more selectable resource(s) chosen via a user interface.

BACKGROUND

[0003] In one form, cryptography is the art and science of Preparing, transmitting and reading message in a form intended to prevent the message from being read by those not privy to secrets associated with the form. Cryptography is practiced in and widely appreciated for a wide array of applications, including gaming, computer security, healthcare information security, banking information security, military communications, mathematics, intellectual property protection and many others.

[0004] In the past, such prior art cryptography techniques encrypted data to make the data difficult, if not impossible, to decrypt. Such techniques were designed to prevent unauthorized review and/or use of the data by third parties. while such prior art cryptography techniques can, in fact, be very difficult to attack and by pass, such techniques remain vulnerable to attacks for several reasons.

FIG. 4A

[0005] A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

15 —

FIELD

[0006] This disclosure relates to authentication techniques and to information security, and more specifically to the generation of a secure key using a sequence of segments taken from one or more selectable resource(s) chosen via a user interface.

BACKGROUND

[0007] ~~In one form, cryptography is the art and science of Preparing, transmitting and reading message in a form intended to prevent the message from being read by those not privy to secrets associated with the form. Cryptography is practiced in and widely appreciated for a wide array of applications, including gaming, computer security, healthcare information security, banking information security, military communications, mathematics, intellectual property protection and many others.~~

[0008] ~~In the past, such prior art cryptography techniques encrypted data to make the data difficult, if not impossible, to decrypt. Such techniques were designed to prevent unauthorized review and/or use of the data by third parties. While such prior art cryptography techniques can, in fact, be very difficult to attack and by pass, such techniques remain vulnerable to attacks for several reasons.~~

[0005] A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD

[0006] This disclosure relates to authentication techniques and to information security, and more specifically to the generation of a secure key using a sequence of segments taken from one or more selectable resource(s) chosen via a user interface.

BACKGROUND

16 ⇗

[0007] In one form, cryptography is the art and science of Preparing, transmitting and reading message in a form intended to prevent the message from being read by those not privy to secrets associated with the form. Cryptography is practiced in and widely appreciated for a wide array of applications, including gaming, computer security, healthcare information security, banking information security, military communications, mathematics, intellectual property protection and many others.

[0008] In the past, such prior art cryptography techniques encrypted data to make the data difficult, if not impossible, to decrypt. Such techniques were designed to prevent unauthorized review and/or use of the data by third parties. While such prior art cryptography techniques can, in fact, be very difficult to attack and bypass, such techniques remain vulnerable to attacks for several reasons.

FIG. 4C

SYSTEM AND METHOD FOR GENERATING A CRYPTOGRAPHIC KEY

CROSS-REFERENCE TO RELATED APPLICATIONS

This application is a continuation of U.S. patent application Ser. No. 14/939,490 filed Nov. 12, 2015, now U.S. Pat. No. 10,050,784, issued Aug. 14, 2018, which claims the benefit of U.S. Provisional Application No. 62/079,031, filed Nov. 13, 2014, both of which are herein incorporated by reference in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD

This disclosure relates to authentication techniques and to information security, and more specifically to the generation of a secure key using a sequence of segments taken from one or more selectable resource(s) chosen via a user interface.

BACKGROUND

In one form, cryptography is the art and science of preparing, transmitting and reading messages in a form intended to prevent the message from being read by those not privy to secrets associated with the form. Cryptography is practiced in and widely appreciated for a wide array of applications, including gaming, computer security, healthcare information security, banking information security, military communications, mathematics, intellectual property protection and many others.

In the past, such prior art cryptography techniques encrypted data to make the data difficult, if not impossible, to decrypt. Such techniques were designed to prevent unauthorized review and/or use of the data by third parties. While such prior art cryptography techniques can, in fact, be very difficult to attack and bypass, such techniques remain vulnerable to attacks for several reasons.

Many prior art cryptography techniques use only a single data block or segment length when encrypting the data. Accordingly, a discernible pattern can be detected and such patterns aid in attacking and bypassing the benefits associated with using such cryptographic techniques. Still further, many prior art cryptography techniques use only a single key to encode all of the data. Accordingly, the use of a single key applied to all blocks or segments of data similarly provides the basis for finding a pattern that can be used to attack such cryptographic techniques.

Presently, the use of electronic data and other information has become an integral part of daily life. Each day, more and more emails, electronic documents, personal information and other forms of electronic data are transmitted throughout the world by businesses and individuals alike. Accordingly, the need to secure such data from unauthorized use and viewing has also increased.

In another form, cryptography is used to implement authentication and verification paradigms. For example, using strong passwords and other cryptographic techniques, a user and/or data can be verified or authenticated. Such authentication provides an enhanced level of trust and security.

Nevertheless, many security problems today arise from the use of weak passwords. By way of example, password creation and usage is dictated by the limited ability of the human mind to remember and/or associate a textual sequence with a given scenario. Accordingly, various stratagems have arisen to compensate for this limitation, such as using associated images with websites, requiring physical gestures, memory mnemonics; sound clips, 'captchas', and the like. However, a key generated by using only one of such resources in its entirety (for example, a specific physical gesture or a specific image) can make such key generation vulnerable from a security point of view; since an intelligent guess of such specific image, physical gesture or the like, by an unauthorized person can be sufficient to compromise the valuable information and/or authenticity of the user protected by such key.

Accordingly, there has been a long felt need for a new, improved, robust yet, user friendly cryptographic key generation technique that can defeat well-known attacks on key generation methodologies. The currently disclosed technology readily satisfies this and other needs.

SUMMARY

Briefly, and in general terms, the disclosure is directed towards generating a strong cryptographic key. More particularly, the key is generated using a sequence of data segments taken from one or more data resources.

In one embodiment, the data resource can be any image, document, video clip, audio clip or any other form of data that is presented to a user. The user can select any one or any combination of data resources for use in creating the key. The one or more data resources can be provided to the user through any appropriate source.

In another embodiment, a graphical aid may be used in association with the data resource to make data segment selection easier for the user. For example, the graphical aid may include a grid overlaying the image, time slices for an audio clip and/or frame layout for a video clip. In other words, any appropriate graphical aid (e.g., of any size, resolution, type, and/or number) may be used to ease the selection process for the user.

In use, a user selects one or more data resources for use in generating the key. Once a data resource is chosen, the user can then (with or without using a graphical aid) select various data segments from the one or more data resources. Each data segment selected from a data resource is placed into a memory in the sequence in which the segment is chosen. Raw data from each data segment is then extracted to generate a key based upon the selection sequence.

In another embodiment, the extracted data from each data segment may be further manipulated to enhance the key strength by further obfuscating the extracted data and any potential data patterns that may exist. Likewise, the generated key (after all data segments have been selected to create the key) can be further manipulated to create an enhanced key strength. Any appropriate cryptographic protocol or paradigm may be used for such manipulation.

The generated key may be used for any cryptographic purpose, including, but not limited to encoding plaintext into messages and for authentication of persons and data.

Other features will become apparent from the following detailed description, taken in conjunction with the accompanying drawings, which illustrate by way of example, the features of the various embodiments.

BRIEF DESCRIPTION OF THE DRAWING

FIG. 4A shows a document resource.

FIG. 4B is the document of FIG. 4A showing sentences presented in selectable segments.

FIG. 4C shows one sequence of the user-selected document resource segments from the document resource of FIG. 4B.

Figure 1:
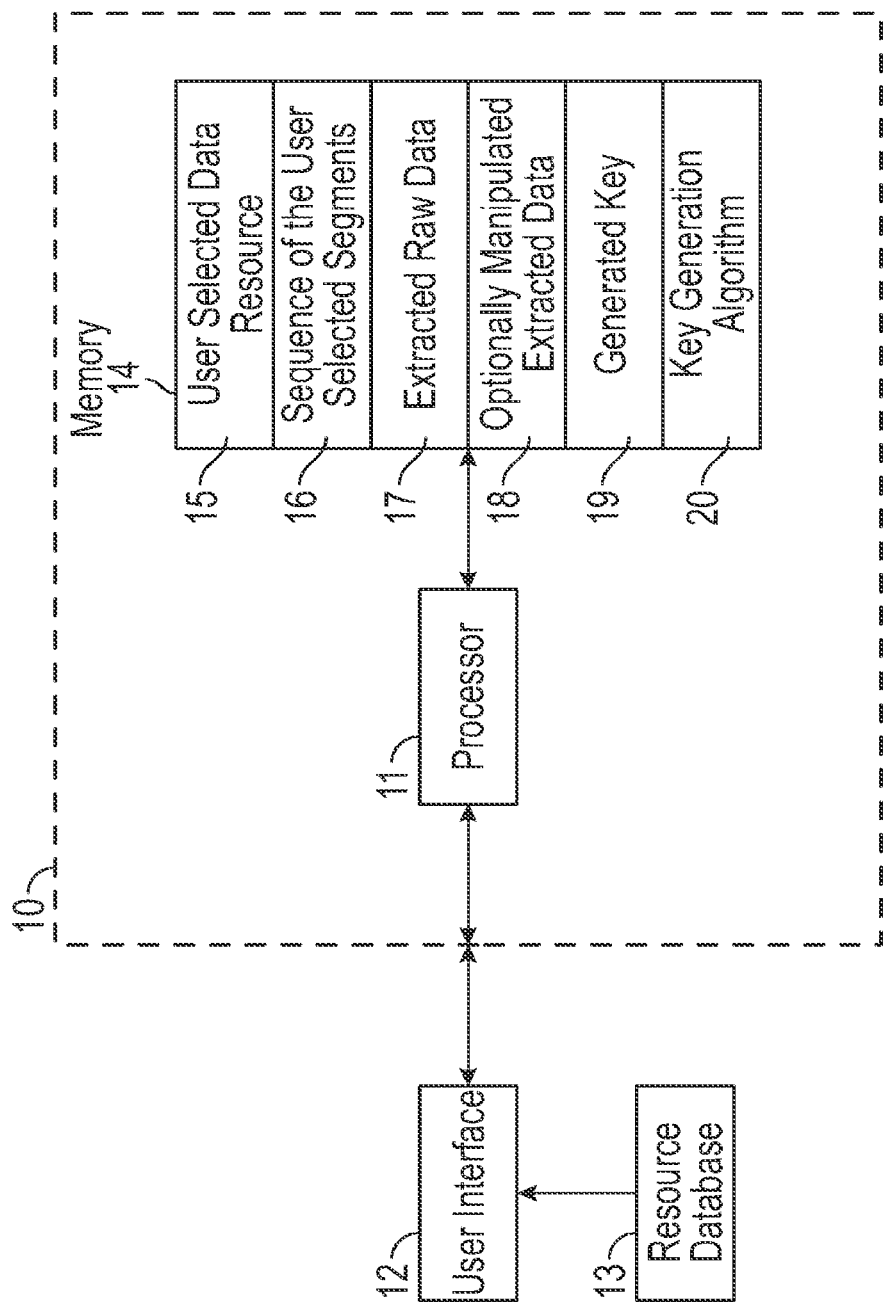
FIG. 1 is a general block diagram of a system that may be used in association with a method of generating a key based on one or more user selected segment[s] from one or more of the presented resource[s].

The figures are only intended to facilitate the description of the various embodiments described herein. The figures do not describe every aspect of the teachings disclosed herein and do not limit the scope of the claims. The figures are not necessarily drawn to scale. The figures or text generally show examples of techniques for using a sequence of resource data selected via a user interface to generate a key. Nonetheless, the teachings are applicable to other implementations without deviating from the present disclosure.

DETAILED DESCRIPTION

Each of the features and teachings disclosed herein can be utilized separately or in conjunction with other features and teachings to provide a system and method of using resource data selected via a user interface for key generation.

Protecting information security and providing for strong authentication is critical in today's information intensive society. The different and various embodiments of techniques for using resource data selected via a user interface for key generation having improved authentication capability, as described herein, enables strong key generation with reduced user memory requirements.

Generally, the different and various embodiments of the present disclosure cover the architecture to utilize various resources (e.g. an image, document, audio file, video file, and the like) or any combination thereof in such a way as to allow a user to easily generate complex security keys with minimal effort. This is accomplished by the user:

1) selecting one or more data resources, and
2) selecting a specific sequence of data segments from within the data resource.

In this way, a key can be generated using the sequence of data segments from each of the one or more data resources. The actual technique of choosing the relevant segments of a resource can be accomplished in any appropriate manner.

More particularly, a user selects one or more data segments in a user friendly sequence to create a strong key. Regardless of the strength of such a key it remains easy for the user to remember the underlying data and chosen selection sequence used to create the key for subsequent recall. The key generated in such a way provides more reliable authentication, which, in turn, provides an enhanced level of trust and security.

In one or more embodiments, a user can be presented with an image from which to select data segments. Such data selection can be done, by way of example only, and not by way of limitation by clicking on the data segments, touching the segments, pointing at the segments, entering segment coordinates via a keyboard or other input device, or the like. Regardless of how the segments are selected, each selected segment's raw data is extracted and accumulated based on the sequence in which each selection of data segment is made by the user. Optionally, each selected segment may be further manipulated to reduce the ability to determine the actual segments selected and/or the sequence of such selection taken by unauthorized persons. Therefore, in addition to the extracted raw data, such further processing of the data can provide an additional level of security to the process of using a sequence of selected resource data to generate a key.

Referring now to the drawings, wherein like reference numerals denote like or corresponding parts throughout the drawings, and more particularly to FIG. 1, there is shown a general system configured for use in performing the disclosed key generation process. The system 10, as disclosed in FIG. 1 includes a processor 11 for operating on the data (e.g. extracting raw data from a sequence of user selected resource segments using a key generation algorithm 20), and a memory 14. In one or more of the embodiments of the present disclosure, the memory 14 can store the user selected data resources 15 taken from a resource database 13, the sequence of the user selected resource segments 16, the extracted raw data 17 from the sequence of the user selected resource segments, the optionally manipulated data 18 from the further manipulation of the extracted raw data, the key generation algorithm 20 and the generated key 19 itself. As used herein, the term "segment" can be used to refer to any part, portion, subset, partition or section of the whole of the resource.

More particularly, the processor 11 can access a resource database 13 via a user interface 12 to select one or more data resources. The resource database 13 can be any form of storage for the data resources, including, but not limited to any memory, the Internet, data file storage and the like. Any appropriate presentation format may be used to present the data resources 15 to the user via the user interface 12 from the resource database 13. For example, all resources in the resource database 13 can be displayed at once to the user via the user interface 12 or only specific resources from the resource database 13 can be displayed to the user via the user interface 12.

Likewise, the user interface 12 can be any appropriate device to enable the presentation of the various data resources to the user for possible selection by the user of such data resource(s) and any possible sequence of data segments 16 selected by the user from such selected data resource. By way of example only, the user interface 12 can be a display used in association with a touch screen device, track ball, mouse, keyboard or any other suitable input device for enabling the user to select the data resource 15 and any potential sequence of data segments therefrom. That is, the user interface 12 can be any device that appropriately enables the selection of data resources 15 and any sequence of data segments 16, therefrom.

As the user selects the data resource 15 and the sequence of data segments 16 from the selected data resource via the user interface 12, the processor 11 places each of the data resources and the segments into the memory 14. The processor 11 operates on the sequence of data segments 16 using the key generation algorithm 20 to extract the raw data associated with each data segment 17 of the data resource 15. This extracted raw data 17 and the sequence in which it is chosen, is used to generate the cryptographic key 19. This key 19 is also stored in the memory 14.

Optionally, the processor 11 can further apply the key generation algorithm 20 to manipulate the extracted raw data 17 from the user selected resource segments 16 to create an enhanced key 19. By way of example and not by way of limitation, such optional manipulation of raw data 17 can be encryption of the data creating the key using any known cryptographic technique or protocol.

The generated key 19 can be used for authenticating a person or data. Further, the generated key 19 can be used to encode data and other information using known cryptographic techniques and protocols.

One of ordinary skill in the art will appreciate that not all systems have all these components and that such systems may have other components in addition to, or in lieu of, those components mentioned here. Furthermore, while these components are viewed and described separately, various components may be integrated into a single unit in some embodiments.

Further, representative examples utilizing many of these features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Figure 5B:
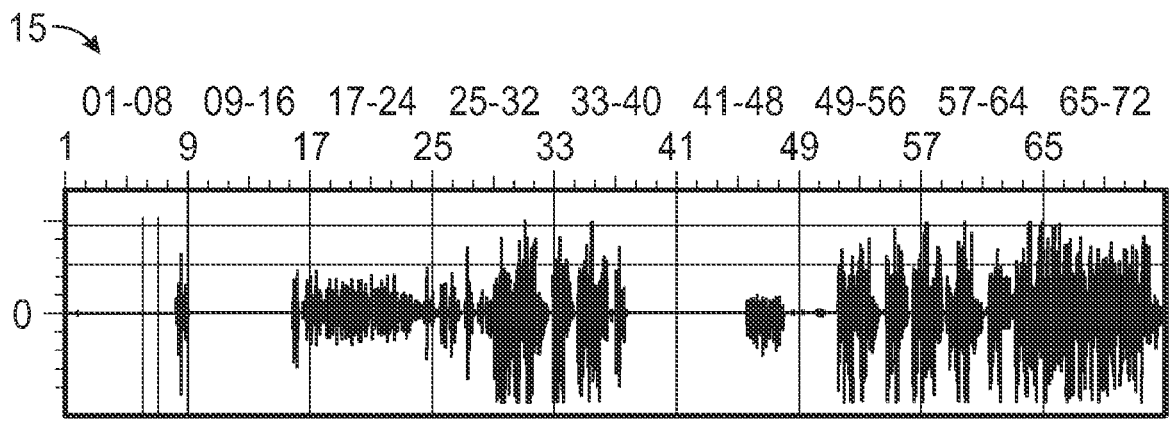
FIG. 5B shows the audio file resource of FIG. 5A presented in selectable time frames.
Figure 6A:
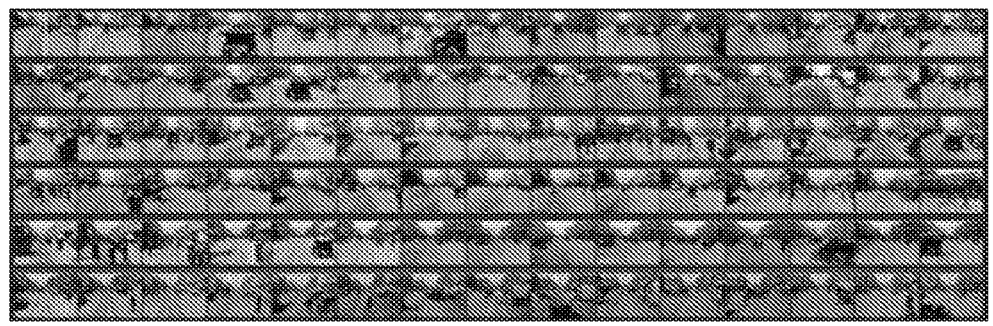
FIG. 6A shows a video file resource divided into multiple frames.
Figure 6B:
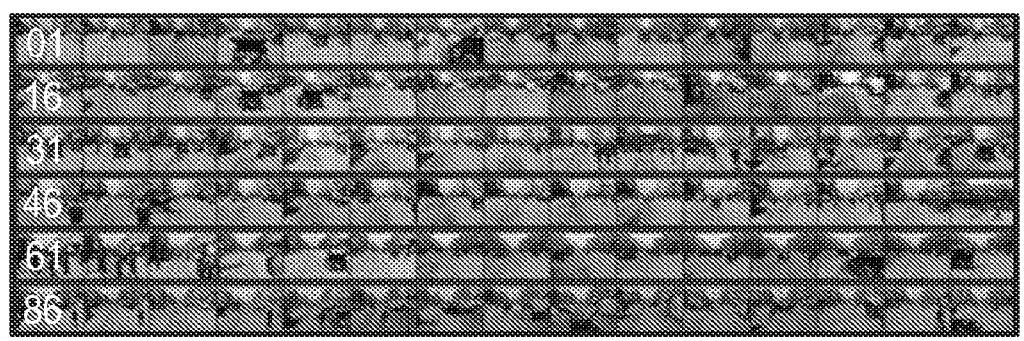
FIG. 6B shows the resource video file of FIG. 6A presented in selectable segments.

In one or more embodiments of the present disclosure, grids or other graphical aids may be used to overlay a resource to make segment selection easier for the user. For example and not by way of any limitation, the grid used in FIGS. 3B-3C, the highlighted sentences in FIGS. 4B-4C, the time sequences shown in FIG. 5B and the video frames show in FIG. 6B are for illustration purposes only and not intended to limit the scope of the claims.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm as used herein is generally conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms presented herein are not inherently related to any particular computer or other apparatus. Various general-purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

In the following description, certain specific details are set forth in order to provide a thorough understanding of various disclosed embodiments. However, one skilled in the relevant art will recognize that embodiments may be practiced without one or more of these specific details, or with other methods, components, materials, and the like. In other instances, well-known structures associated with servers, networks, displays, media handling, computers and/or processor/control systems have not been shown or described in detail to avoid unnecessarily obscuring descriptions of the embodiments.

Unless otherwise indicated, the functions described herein may be performed by executable code and instructions stored in a computer readable medium and running on one or more processor-based systems. However, state machines and/or hardwired electronic circuits may also be utilized. Further, with respect to the example processes described herein, not all of the process states need to be reached, nor do the states have to be performed in the illustrated order. Further, certain process states that are illustrated as being serially performed may be performed in parallel.

Similarly, unless expressly stated to be otherwise, while certain embodiments may refer to a Personal Computer ("PC") system or data device, other computer or electronic systems may be used as well, such as, without limitation, an interactive television, a network-enabled personal digital assistant ("PDA"), a network game console, a networked entertainment device, a smart phone (e.g., with an operating system and on which a user may install applications) and the like.

In addition, while certain user inputs or gestures are described as being provided via phone key-presses, data entry via a keyboard, or by clicking a computer mouse or button, touchscreen optionally, user inputs may be provided using other techniques, such as by voice or otherwise. The example screen layouts, appearance, and terminology as depicted and described herein, are intended to be illustrative and exemplary, and in no way limit the scope of the invention as claimed.

The terms, "for example," "e.g.," "in one/another aspect," "in one/another scenario," "in one/another version," "in some configurations" "in some implementations," "preferably," "usually," "typically," "may," and "optionally," as used herein, are intended to be used to introduce non-limiting embodiments. Unless expressly stated otherwise, while certain references are made to certain example system components or services, other components and services may be used as well and/or the example components may be combined into fewer components and/or divided into further components. The terms, "member" and "user," are used interchangeably. Members and users are subscribed to or enrolled in a network service or network of users.

Figure 2:
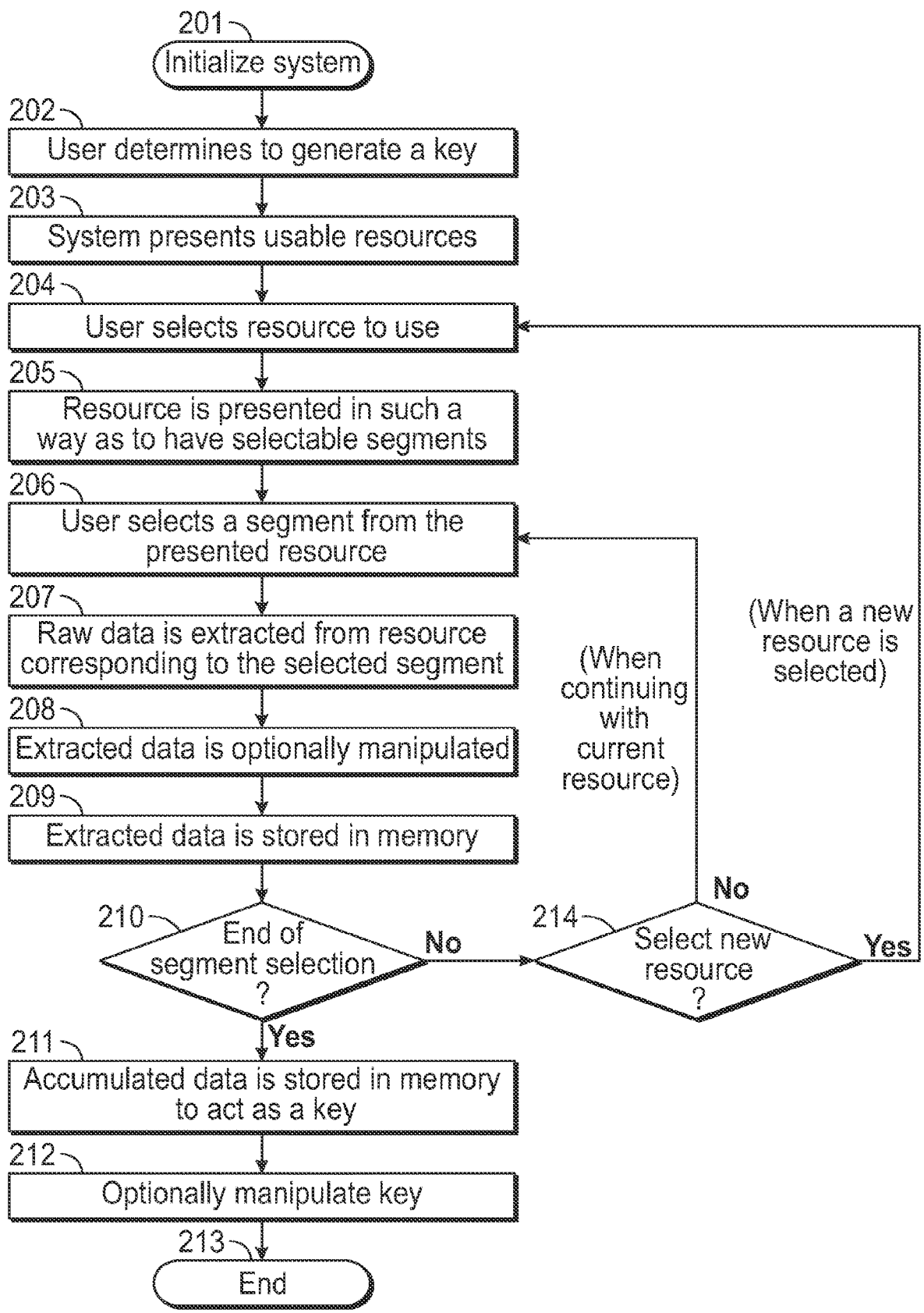
FIG. 2 is a logic flow diagram of a method of generating a key based on one or more user selected segment[s] from one or more of the presented resource[s].

Referring again to the drawings, and more particularly to FIG. 2, there is shown one embodiment of the key generation process.

Beginning at step 201, the processor 11 initializes the system 10 to perform the disclosed key generation process. At step 202, the user determines to generate a key. Next, at step 203 the system presents multiple data resources (from the resource database 13) to the user via the user interface 12. At step 204, the user selects a resource from the usable resources presented to the user via the user interface 12. Such resource selection can be made using a touch screen, keyboard, mouse, trackball, voice or any other input device.

At step 205, the system presents the resource selected by the user in such a way as to have selectable segments. In some embodiments, the user interface 12 can overlay the data resource with a graphical representation to aid the user's selection of data segments. For example, the user interface can overlay a grid onto an image. Such grids can comprise any shape, such as, a circle, square, rectangle, triangle or the like. As such, the image can be divided into multiple segments via a grid and presented to the user as a resource. The user then can choose any segment of the gridded image. Of course, it is understood that the user can determine the number of resources that can be presented via the user interface 12, the dimensions and resolution of any grid or other graphical aid used with the resource, and the like. Furthermore, in some embodiments, the data segments can be further subdivided into additional data segments. By doing so, the user can alter the specificity of the segments chosen from each data resource.

Next, at step 206, the user selects a segment 16 from the data resource 15 (the user continues selecting segments to create a sequence of selected segments 16 from the data resources until the user chooses to end the selection process-step 210). Such selection can be done by clicking on the segment, touching the segment, pointing at the segment, entering segment coordinates using an appropriate input device, and the like. It is up to the user to choose the total number of selectable segments chosen from a data resource.

At step 207, the processor 11 extracts the raw data from the selected segment of the chosen data resource (in later steps, the extracted data from each of the selected segment of the chosen data resource is used to generate the key). In some embodiments, the extracted data is metadata.

Optionally, at step 208, the raw data extracted from the selected segment is further manipulated to enhance the strength of the key produced from the extracted raw data. By way of example and not by way of limitation, such manipulation of extracted raw data can include encryption using any protocol of such raw data. At the next step 209, either the extracted raw data 17 and/or the manipulated data 18 from the user selected data segment is stored in the memory 14 in binary format. In some embodiments, the raw data from the selected data segments can be stored in any other appropriate manners in memory 14.

At step 210, the process determines whether the selection of the data segments by the user has ended. If so, the process continues to step 211 and the raw data extracted from the one or more data segment(s) 16 of the selected one or more data resources 15 are stored in the memory in the sequence in which the segments are selected by the user. Accordingly, the key comprising the extracted raw data from the sequence of the user selected data segments 16 is generated and stored into the memory 14.

Optionally, at the next step 212, the key comprising the sequence of the extracted raw data is further manipulated to enhance the key strength. In such case, the process continues to step 213 and ends after storing the manipulated key from step 212 into memory 14.

On the other hand, at step 210, if some segments remain to be selected, then the process continues to step 214. In this step 214, the process determines if any new resource needs to be selected. If the user choses a new resource, the process proceeds to step 204 and continues in a round robin fashion until the segment selection is completed for all selected resources (step 210). Alternatively, if at step 214, the process determines there is no new resource to be selected, the process returns to step 206 and continues in a round robin fashion until the segment selection is completed for the current resource (step 210).

By way of example only, and not by way of limitation, the following are few implementations of the disclosed cryptographic key generation process.

Example 1

Figure 3A:
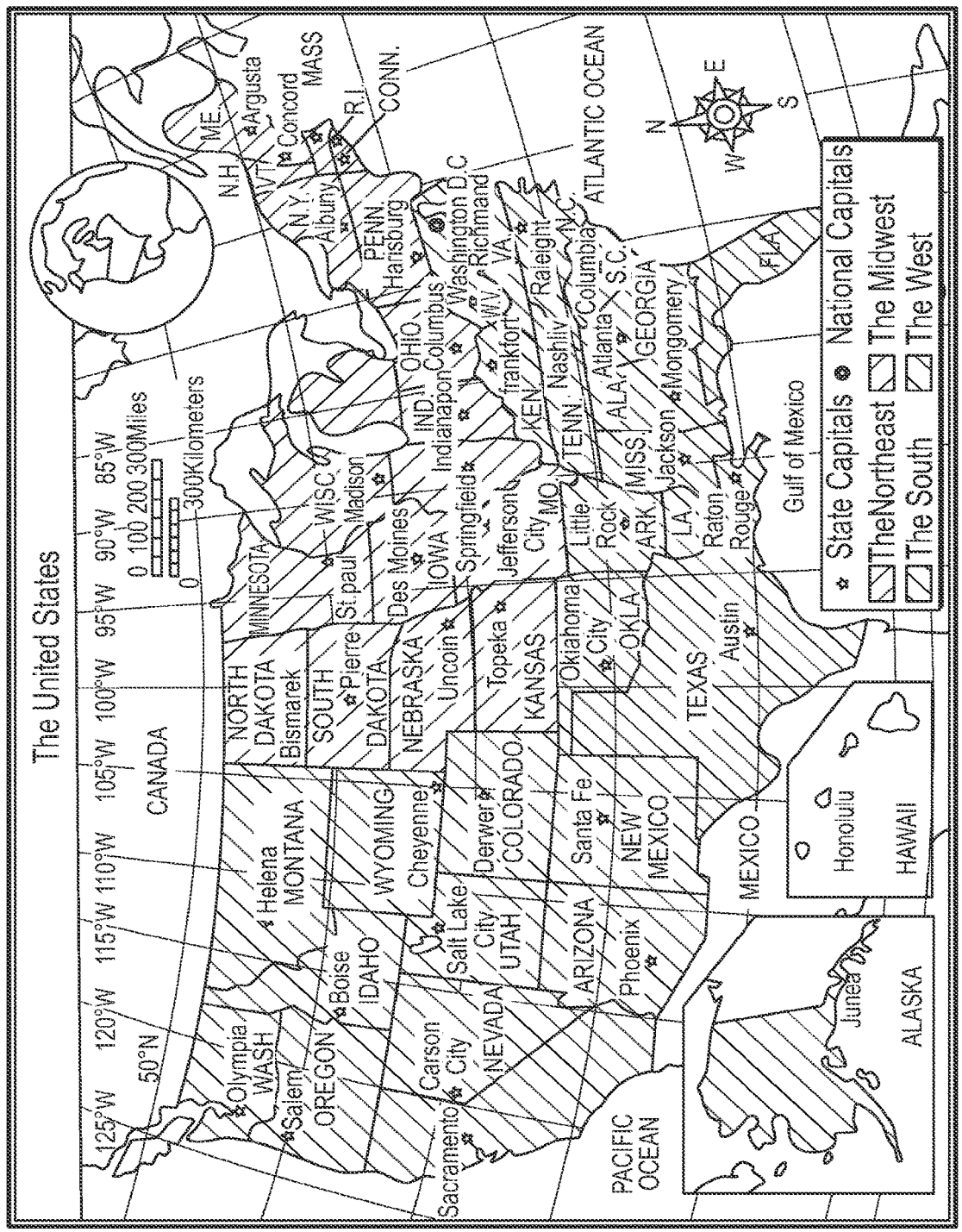
FIG. 3A shows an image resource.
Figure 3B:
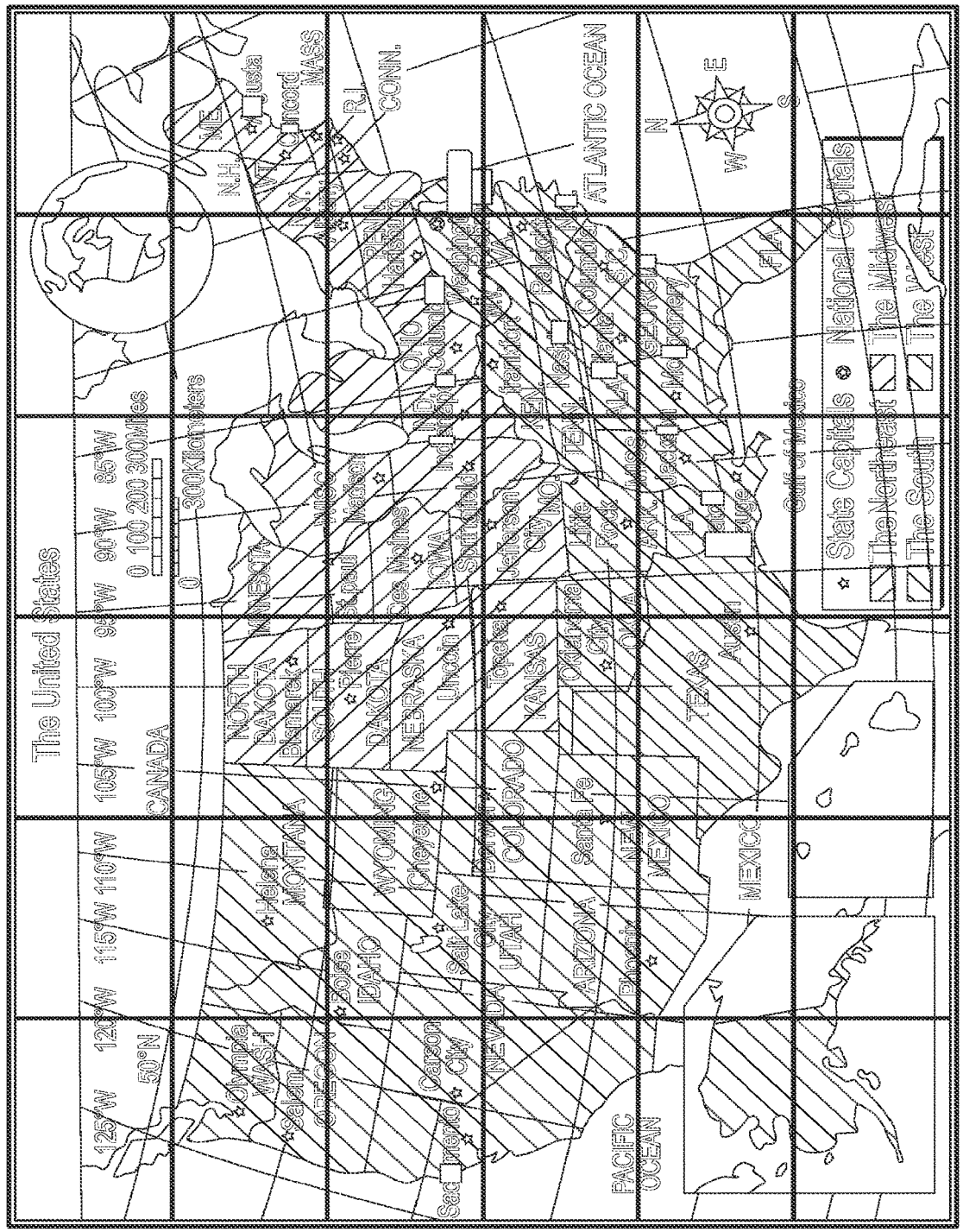
FIG. 3B shows the image of FIG. 3A with a grid overlay.
Figure 3C:
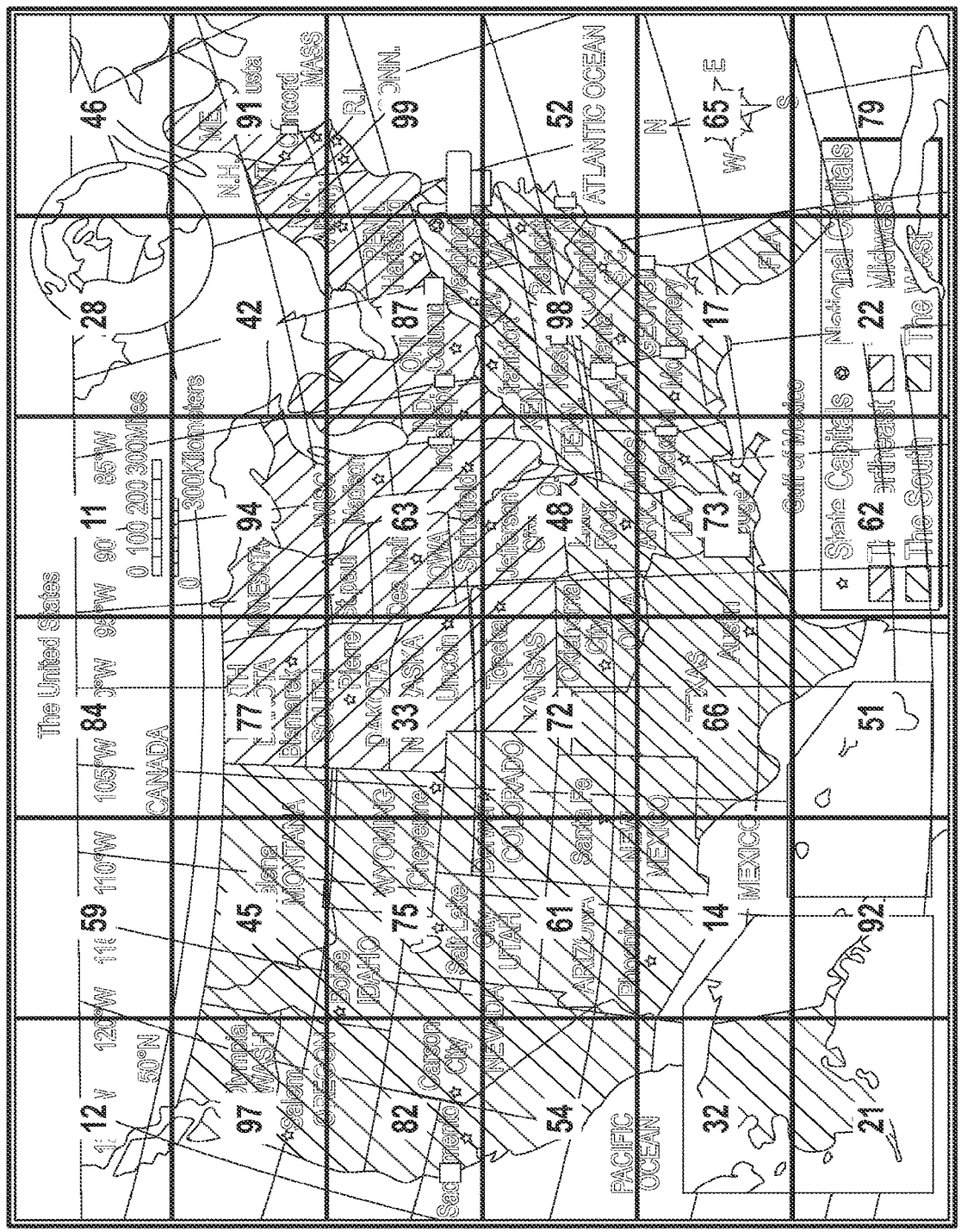
FIG. 3C shows the image of FIG. 3B presented in selectable segments and the underlying data per segment of such resource.

In one embodiment, the data resource 15 is an image. Referring back to the drawings, FIG. 3A shows a map of the USA as an exemplary image resource. Such image resource can be selected by the user from an image gallery, containing multiple images, via the user interface or through any other appropriate technique. FIG. 3B shows the image of FIG. 3A with a grid overlay. FIG. 3C shows the image resource of FIG. 3B presented in selectable segments with the same quantity of data in each segment. Each segment of the map can represent any amount of raw data. The data shown in FIG. 3C is for illustrative purposes only and should not be construed as limiting herein. The raw data can take any form and be of any size.

Figure 3D:
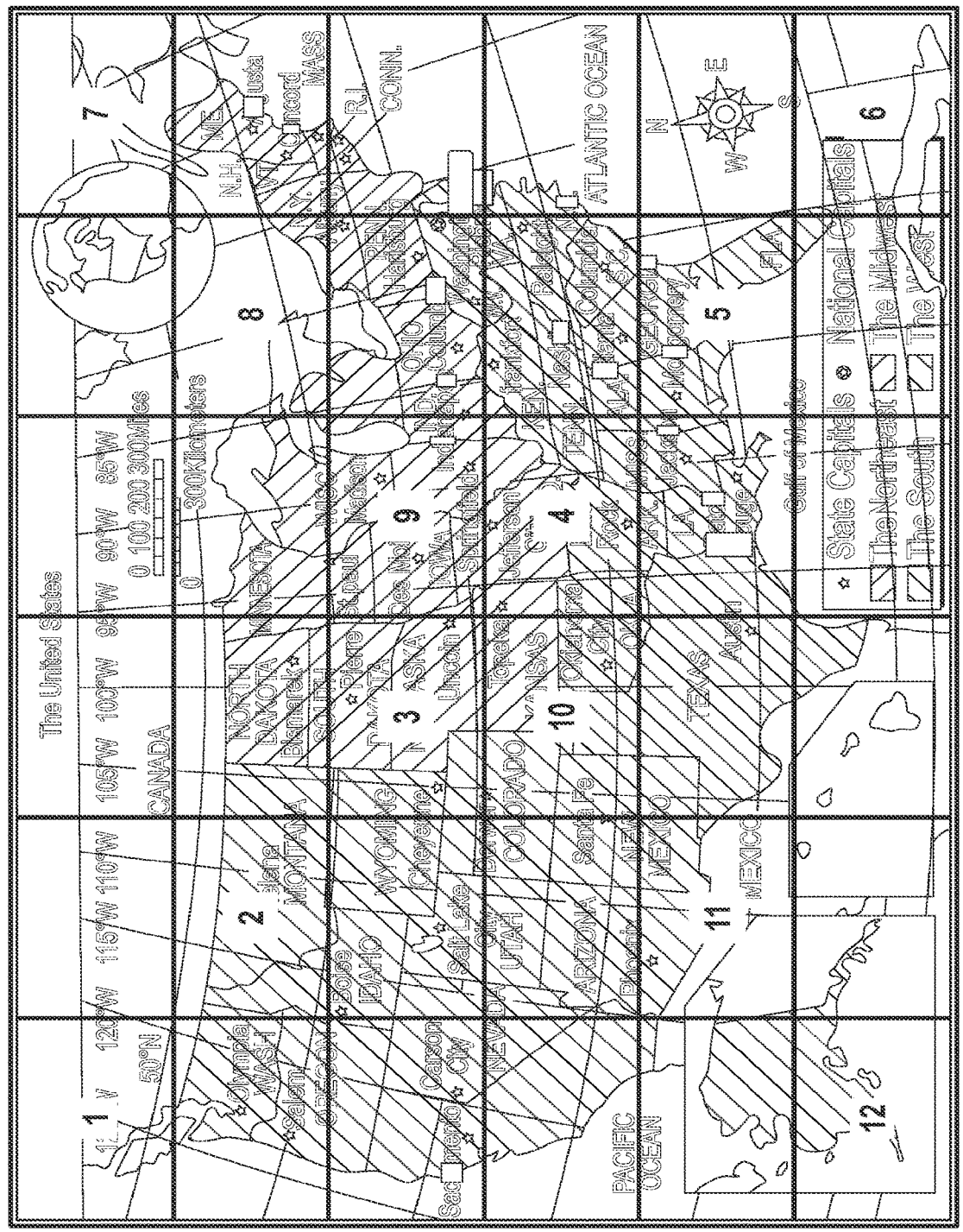
FIG. 3D shows one example sequence of the user-selected image resource segments from the segmented image resource of FIG. 3C.

The user then selects segments from the image of the USA map of FIG. 3A, for example, in an 'X' pattern sequence as shown in FIG. 3D. The data associated with the selected sequence of image segments is 12, 45, 33, 48, 17, 79, 46, 42, 63, 72, 14 and 21 (see FIG. 3C). The processor 11 communicates with the memory 14 to extract the raw data from the user selected sequence of image segments and then the processor 11 stores the extracted raw data 17 in the memory 14 as the key 19.

For example and not by way of limitation, the user selects data segments 1, 2 and 5 from the image. The extracted data from the data segments is (1)=001; (2)=100 and (5)=101, respectively. A key generated based on the sequence of the selected segments from this image is 001100101.

Example 2

In this example, the data resource 15 is a document comprising text. Referring to FIG. 4A, the user chooses the document as a data resource. As shown in FIG. 4B, the document is presented to the user in a selectable format. In this case, sentences are presented in the document as highlighted by different shading. In some embodiments, words, paragraphs, sections, or the like, of the document can also be presented in selectable segments. The user then selects a sequence of segments from the document as shown in FIG. 4C. Subsequently, the data associated with the user selected sequence of document segments are extracted by the processor 11. The extracted raw data from each of the segments in the sequence selected by the user is stored in the memory 14 as the key 19.

Example 3

In this example, an audio clip is the data resource 15. Referring to the embodiment of FIG. 5A, the user choses to use an audio clip as a data resource. FIG. 5B shows the audio clip in a segmented or time frame pattern (e.g. the first segment comprises 1st-8th time frames, the second segment comprises 9th-16th time frames and the like). The user then selects a sequence of the certain audio segments, as shown in FIG. 5C. Subsequently, the data associated with the user selected sequence of audio segments is extracted by the processor 11. The extracted raw data from each of the segments of such sequence of user selected segments is stored in the memory 14 as the key 19.

Example 4

Figure 6C:
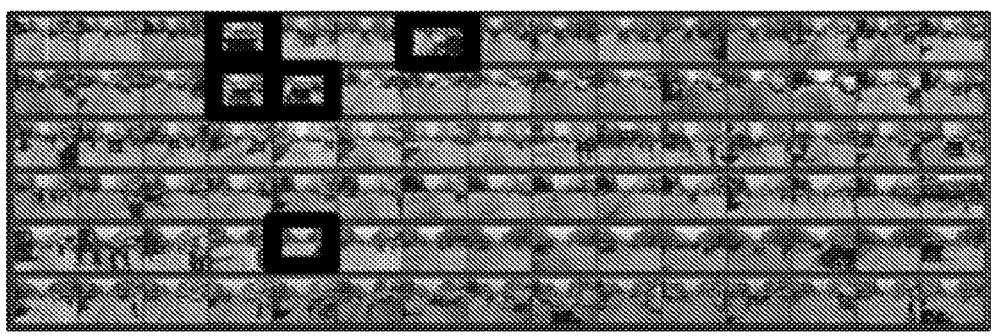
FIG. 6C shows one sequence of the user-selected segments (or video frames) from the video file resource of FIG. 6B.

In this example a video clip is used as the data resource 15. Referring to the embodiment of FIG. 6A, the user chooses to use a video clip as a data resource. FIG. 6B shows the resource video file of FIG. 6A presented in selectable segments (for example, in FIG. 6B, the video file resource of FIG. 6A is divided into 100 frames). The user then selects a sequence of certain video frames, as seen in FIG. 6C. Subsequently, the data associated with the user selected sequence of video segments is extracted by the processor 11. The extracted raw data from each of the segments of such sequence of user selected segments is stored in the memory 14 as the key 19.

Example 5

In this example, multiple different data resources 15 are used to generate the key versus using any one type of data resource (e.g. only image, text or audio data alone). Referring back to the drawings, FIG. 3A shows a map of the USA as an exemplary image resource. Such image resource can be selected by the user from an image gallery, containing multiple images, via the user interface or through any other appropriate technique. FIG. 3B shows the image of FIG. 3A with a grid overlay. FIG. 3C shows the image resource of FIG. 3B presented in selectable segments with the same quantity of data in each segment. Each segment of the map can represent any amount of raw data.

The user then selects segments from the image of the USA map of FIG. 3A, for example, in an 'X' pattern sequence as shown in FIG. 3D. The data associated with the selected sequence of image segments is 12, 45, 33, 48, 17, 79, 46, 42, 63, 72, 14 and 21 (see FIG. 3C). The processor 11 communicates with the memory 14 to extract the raw data 17 from the user selected sequence of image segments and then the processor 11 stores the extracted raw data in the memory 14.

In the next step, as shown in FIG. 4A, the user chooses a document as a data resource. As shown in FIG. 4B, the document is presented to the user in a selectable format. In this case, sentences are presented in the document as highlighted by different shading. In one or more embodiments, words, paragraphs, sections, or the like, of the document can also be presented in selectable segments. The user then selects a sequence of segments from the document, as shown in FIG. 4C. Subsequently, the data associated with the user selected sequence of document segments are extracted by the processor 11. The extracted raw data from each of the segments in the sequence selected by the user is stored in the memory 14.

Figure 5A:
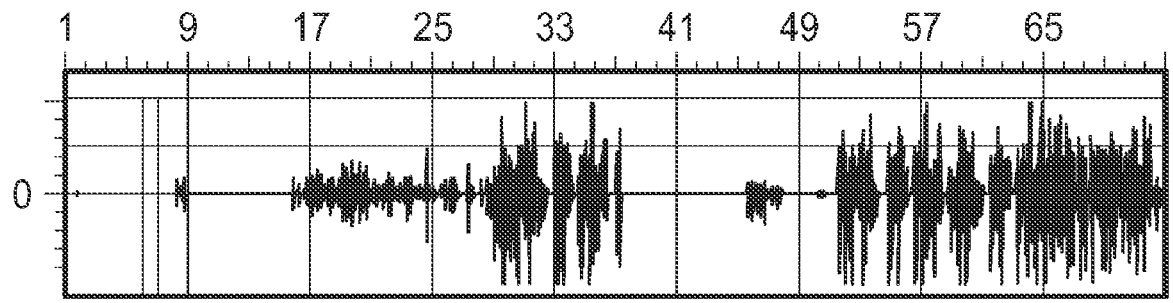
FIG. 5A shows an audio file resource.
Figure 5C:
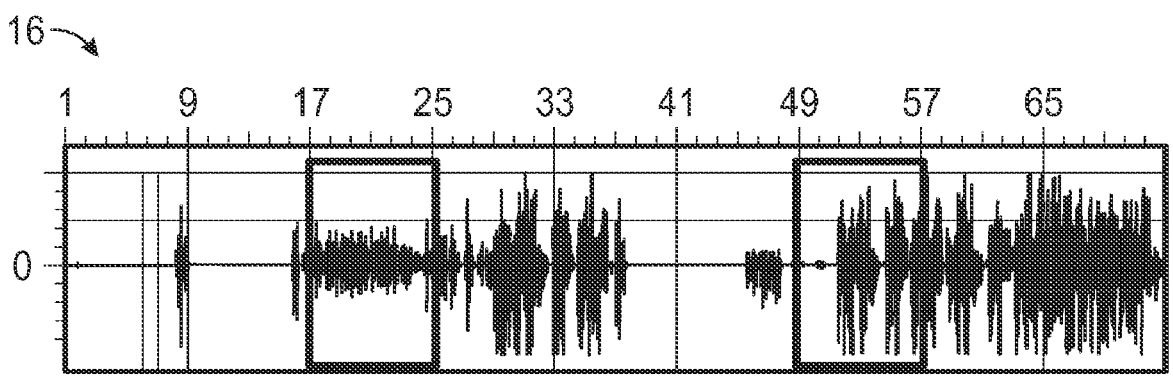
FIG. 5C shows one sequence of the user-selected time frames from the audio file resource of FIG. 5B.

The user then chooses an audio clip as a data resource as shown in FIG. 5A. In FIG. 5B the audio clip is shown in a segmented or time frame pattern (e.g. the first segment comprises 1st-8th time frames, the second segment comprises 9th-16th time frames and the like). The user then selects a sequence of the certain audio segments, as shown in FIG. 5C. Subsequently, the data associated with the user selected sequence of audio segments is extracted by the processor 11. The extracted raw data from each of the segments of such sequence of user selected segments is stored in the memory 14.

The user then chooses to use a video clip as a data resource as shown in FIG. 6A. FIG. 6B shows the resource video file of FIG. 6A presented in selectable segments (for example, in FIG. 6B, the video file resource of FIG. 6A is divided into 100 frames). The user then selects a sequence of certain video frames, as seen in FIG. 6C. Subsequently, the data associated with the user selected sequence of video segments is extracted by the processor 11. The extracted raw data from each of the segments of such sequence of user selected segments is stored in the memory 14.

Once the user ends the segment selection process (i.e. when step 210 of the logic flow diagram of FIG. 2 returns "YES"), the processor creates a preliminary key containing the extracted raw data from the user selected segments of the image, document, audio and video resources of FIGS. 3A, 4A, 5A and 6A in the sequence in which the segments are selected by the user.

For all the examples discussed above, the extracted data that creates the key may be optionally manipulated to further enhance the key strength. By way of example only, the extracted raw data from each resource representing each selected segment (accumulated in the manipulated key) is XOR'd with the user's optional value of 'my secret'. "My secret" can be any appropriate cryptographic protocol selected by the user. The enhanced key in such manner provides improved security since to reproduce such a key would require:

1. What data resources were selected and from where;
2. What sequence of segments were selected from each resource; and
3. The optional user value used to process each selected segment Therefore, using the disclosed system and method of key generation, as described herein, the user can create a complex key that provides better security, yet is simple for the user to generate and memorize. The key generation process, as described herein selects resources and segments in a manner that is catered to the user's personal choices, mannerisms, and experiences.

Various aspects of the systems, methods, functions, steps, features and the like corresponding thereto disclosed herein may be implemented on one or more computer systems using hardware, software, firmware, circuits, or combinations thereof. Hardware, software, firmware, and circuits respectively refer to any hardware, software, firmware, or circuit component. Computer systems referred to herein may refer to any computing device and vice versa (e.g., smart phone, mobile computing device, personal data assistant, tablet computer, laptop computer, desktop computer, other computing device, and the like). For example, each computer system or computing device in the systems described herein or any embodiment of a system disclosed herein may utilize one or more of the following components: a single-core or multi-core hardware processor (e.g., central processing unit or graphics processing unit) on which software instructions are executed (e.g., instructions corresponding to an operating system, an application program, an interpreter such as a virtual machine, or a compiler); a memory associated with and in connection with the hardware processor such as cache or other system memory that stores software instructions or other data that the hardware processor may access for processing; an input device (e.g., mouse, keyboard, touchscreen, and the like); an output device (e.g., display, touchscreen, printer, and the like); a network or communication interface that enables the computer system to communicate over a network or communication protocol; an application program having corresponding software instructions that are executable by a hardware processor. Connections between different computer systems and connections between different computer system components may be wired or wireless.

Virtualization computing techniques, cloud computing techniques, web application/website computing techniques, traditional and adaptive streaming techniques, and other computing techniques may be implemented by any embodiment of a system disclosed herein to enable and/or enhance the teachings described herein. For example, in a cloud computing embodiment, one or more servers (i.e., one or more computer systems) may store and execute software instructions corresponding to an application program based on input data received from client devices. In response to the input data received, the application program is executed accordingly, which results in graphical data being processed and output to the client devices for display on a display such as a touch screen on a smart phone or tablet computer.

As another example, in a web application or website embodiment, data representative of a user input may be transmitted to a server (i.e., a computer system) hosting the website for processing and storage in memory. In an application program embodiment, the application may be stored and executed locally on a user's computer system. In other embodiments, one or more components of the application program may be stored and executed on a server and the user's computer system. For example, a user may download the application program from an app store for an Android computing device, Blackberry computing device, Apple computing device, Windows computing device, Samsung computing device, other computing device, and the like. Execution of the application program on the user's computing device may require that the device transmit and receive data to and from one or more computing devices such as a server or other user's computing device. For example, an application may be downloaded from a server to a mobile device. Upon installation, the mobile device may communicate with a server.

One or more embodiments of the systems disclosed herein may utilize streaming technology. Streaming data enables data to be presented to the user of the client device while the client device receives data from the server. Streaming data from servers to client devices (e.g., computing devices operated by users) over a network is typically limited by the bandwidth of the network, or alternatively, the physical layer net bitrate. Traditional streaming protocols, such as RTSP (Real-Time Streaming Protocol), MS-WMSP (Windows Media HTTP Streaming Protocol), and RTMP (Real-Time Messaging Protocol) may be implemented, which essentially send data in small packets from the server to the client device in real-time at the encoded bitrate of the data. Adaptive streaming may also be implemented. Adaptive streaming almost exclusively relies on HTTP for the transport protocol. Similar to traditional streaming, data is encoded into discrete packets of a particular size; however, the source data is encoded at multiple bitrates rather than a single bitrate. The data packets corresponding to the same data encoded at different bitrates are then indexed based on the bitrate in memory. This streaming method works by measuring, in real-time, the available bandwidth and computer capacity of the client device, and adjusts which indexed data packet to transfer based on the encoded bitrate.

One or more aspects of the systems disclosed herein may be located on (i.e., processed, stored, executed, or the like; or include one or more hardware or software components) a single computer system or may be distributed among a plurality of computer systems attached by one or more communication networks (e.g., internet, intranet, a telecommunications network, and the like). One or more components of a computer system may be distributed across one or more computer systems in communication with the computer system over a communication network. For example, in some embodiments, the systems disclosed herein may utilize one or more servers (i.e., one or more computer systems dedicated for a particular purpose in the system) that may be dedicated to serve the needs of one or more other computer systems or components across a communication network and/or system bus. The one or more servers may provide a central processing location for one or more aspects of the systems disclosed herein.

Again, various aspects of the systems, methods, function, and steps corresponding thereto disclosed herein may be implemented on one or more computer systems using hardware, software, firmware, or combinations thereof. Those of ordinary skill in the art will appreciate that one or more circuits and/or software may be used to implement the system and methods described herein. Circuits refer to any circuit, whether integrated or external to a processing unit such as a hardware processor. Software refers to code or instructions executable by a computing device using any hardware component such as a processor to achieve the desired result. This software may be stored locally on a processing unit or stored remotely and accessed over a communication network.

As disclosed herein, a processor or hardware processor may refer to any hardware processor or software processor. A software processor may include or otherwise constitute an interpreter that is executed by a corresponding hardware processor. A computer system according to any embodiment disclosed herein is configured to perform any of the described functions related to the various embodiments of the systems disclosed herein.

As disclosed herein, any method, function, step, feature, or result may be considered a module that may include software instructions that cause, when executed by a computing device, the desired method, function, step, feature, or result. Executed by a computing device includes execution by any hardware component (e.g., CPU, GPU, network interface, integrated circuits, other hardware components, and the like) of the computing device such as a hardware processor. Any module may be executed by a computing device (e.g., by a processor of the computing device). Any method, function, step, feature, result, and the like disclosed herein may be implemented by one or more software modules whether explicitly described or not. Individual components within a computing device may work together to accomplish a desired method, function, step, feature, or result. For example, a computing device may receive data and process the data. A simple example would be that a network interface receives the data and transmits the data over a bus to a processor.

Various aspects of the systems disclosed herein may be implemented as software executing in a computer system. The computer system may include a central processing unit (i.e., a hardware processor) connected to one or more memory devices, a graphical processing unit, input devices such as a mouse and keyboard, output devices such as speakers and a display, a network interface to connect to one or more other computer systems (e.g., one or more computer systems configured to provide a service such that function as a database), an operating system, a compiler, an interpreter (i.e., a virtual machine), and the like. The memory may be used to store executable programs and data during operation of the computer system. The executable programs may be written in a high-level computer programming language, such as Java or C++. Of course, other programming languages may be used since this disclosure is not limited to a specific programming language or computer system. Further, it is to be appreciated that the systems and methods disclosed herein are not limited to being executed on any particular computer system or group of computer systems.

Some methods, functions, steps, or features have been described as being executed by corresponding software by a processor. It is understood than any methods, functions, steps, features, or anything related to the systems disclosed herein may be implemented by hardware, software (e.g., firmware), or circuits despite certain methods, functions, steps, or features having been described herein with reference to software corresponding thereto that is executable by a processor to achieve the desired method, function, or step. It is understood that software instructions may reside on a non-transitory medium such as one or more memories accessible to one or more processors in the systems disclosed herein. For example, where a computing device receives data, it is understood that the computing device processes that data whether processing the data is affirmatively stated or not. Processing the data may include storing the received data, analysing the received data, and/or processing the data to achieve the desired result, function, method, or step. It is further understood that input data from one computing device or system may be considered output data from another computing device or system, and vice versa. It is yet further understood that any methods, functions, steps, features, results, or anything related to the systems disclosed herein may be represented by data that may be stored on one or more memories, processed by one or more computing devices, received by one or more computing devices, transmitted by one or more computing devices, and the like.

The various embodiments and examples described herein are provided by way of illustration only and should not be construed to limit the claimed invention, nor the scope of the various embodiments and examples. Those skilled in the art will readily recognize various modifications and changes that may be made to the claimed invention without following the example embodiments and applications illustrated and described herein, and without departing from the true spirit and scope of the claimed invention, which is set forth in the following claims. In addition, various embodiments may be combined. Therefore, reference to an embodiment, one embodiment, in some embodiments, in other embodiments, and the like does not preclude one or more methods, functions, steps, features, results, hardware implementations, or software implementations of different embodiments from being combined. Further, reference to an embodiment, one embodiment, in some embodiments, in other embodiments, examples, and the like provides various aspects that may or may not be combined with those of one or more different embodiments and/or examples.

What is claimed:

1. A system for generating a cryptographic key for data encryption or authentication, comprising:
   a hardware processor; and
   a memory communicatively coupled to the processor, the memory including:
      a first software that is executable by the hardware processor and is configured to extract raw data directly from at least (i) a first plurality of segments associated with a first data resource being a first resource type and (ii) one or more segments associated with a second data resource being a second resource type,
         wherein the first resource type and the second resource type are selected from a plurality of resource types comprising an image resource type, a video resource type, an audio resource type, or a document resource type,
         wherein the second resource type is different from the first resource type, and
         wherein the raw data is stored as binary data in the memory;
      a second software that is executable by the hardware processor and is configured to maintain information in accordance with a selected sequence of the extracted raw data from at least the first data resource and the second data resource; and
      a third software that is executable by the hardware processor and is configured to create a cryptographic key from the extracted raw data from at least the first plurality of segments associated with the first data resource and the one or more segments associated with the second data resource while maintained in accordance with the selected sequence, wherein the cryptographic key, stored in the memory, is for use in encrypting plaintext data.

2. The system of claim 1, wherein the first plurality of segments associated with the first data resource is selected via a user interface.

3. The system of claim 2, wherein the first data resource comprises a gallery of images and the raw data is the binary data stored in the memory prior to generation of one or more images associated with the gallery of images.

4. The system of claim 3, wherein the second data resource corresponds to one of: (i) a document with either words, paragraphs or sentences corresponding to the one or more segments, or (ii) a video clip with different sequences of video frames corresponding to the one or more segments, or (iii) an audio clip with different sequences of audio segments corresponding to the one or more segments.

5. The system of claim 2, wherein the first data resource comprises an image divided into multiple grids and the raw data is data stored in the memory prior to generation of the image.

6. The system of claim 5, wherein the second data resource corresponds to (i) a document with either words, paragraphs or sentences corresponding to the one or more segments, or (ii) a video clip with different sequences of video frames corresponding to the one or more segments, or (iii) an audio clip with different sequences of audio segments corresponding to the one or more segments.

7. The system of claim 5, wherein the second data resource corresponds to an audio clip with different sequences of audio segments corresponding to the one or more segments.

8. The system of claim 2, wherein the first data resource is a video clip divided into multiple grids and the raw data is data stored in the memory prior to generation of a video frame of the video clip.

9. The system of claim 2, wherein the one or more segments associated with the second data resource are selected via the user interface.

10. The system of claim 9, wherein the user interface is a touch screen display device and each of the first plurality of segments is selected by touching an area of the touch screen display device displaying a corresponding segment of the first plurality of segments.

11. The system of claim 1, wherein the extracted raw data includes binary data associated with the first plurality of segments and binary data associated with the one or more segments.

12. The system of claim 1, wherein the extracted raw data includes metadata associated with the first plurality of segments.

13. The system of claim 1, wherein the cryptographic key is a concatenation of the extracted raw data in accordance with the selected sequence.

14. The system of claim 1, wherein the cryptographic key is further manipulated to enhance a strength of the cryptographic key by conducting a logical operation between the cryptographic key and a secret value.

15. The system of claim 1,
wherein the first data resource corresponds to one of (i) a gallery of images or an image divided into multiple grids with the raw data being the binary data stored in the memory associated with the gallery of images or the divided image, or (ii) a document with either words, paragraphs or sentences corresponding to the one or more segments, or (iii) a video clip with different sequences of video frames corresponding to the one or more segments, or (iv) an audio clip with different sequences of audio segments corresponding to the one or more segments, and
wherein the second data resource corresponds to one of (i) the gallery of images or the divided image, or (ii) the document, or (iii) the video clip, or (iv) the audio clip.

16. A computer-implemented method for generating a cryptographic key for data encryption or authentication, comprising:
extracting raw data directly from at least (i) a first plurality of segments associated with a first data resource being a first resource type and (ii) one or more segments associated with a second data resource being a second resource type,
wherein the first resource type and the second resource type are selected from a plurality of resource types comprising an image resource type, a video resource type, an audio resource type, or a document resource type,
wherein the second resource type is different from the first resource type, and
wherein the raw data is stored as binary data in a computer-readable memory;
maintaining information in accordance with a selected sequence of the extracted raw data from at least the first data resource and the second data resource; and
creating a cryptographic key from the extracted raw data from at least the first plurality of segments associated with the first data resource and the one or more segments associated with the second data resource while maintained in accordance with the selected sequence,
wherein the cryptographic key, stored in the computer-readable memory, is for use in encrypting plaintext data.

17. The computer-implemented method of claim 16, wherein the first plurality of segments associated with the first data resource corresponds to either (i) a gallery of images and the raw data is the binary data stored in the computer-readable memory prior to generation of the images associated with the gallery of images or (ii) an image divided into multiple grids and the raw data is data stored in the computer-readable memory prior to generation of the image.

18. The computer-implemented method of claim 17, wherein the second data resource corresponds to (i) a document with either words, paragraphs or sentences corresponding to the one or more segments, or (ii) a video clip with different sequences of video frames corresponding to the one or more segments, or (iii) an audio clip with different sequences of audio segments corresponding to the one or more segments.

19. The computer-implemented method of claim 18, wherein the first plurality of segments associated with the first data resource and the one or more segments associated with the second data resource are selected via an user interface.

20. The computer-implemented method of claim 16, wherein the extracted raw data includes binary data associated with the first plurality of segments and binary data associated with the one or more segments.

21. The computer-implemented method of claim 16, wherein the cryptographic key is based at least on a concatenation of the extracted raw data in accordance with the selected sequence.

* * * * *